Patented Apr. 2, 1946

2,397,547

UNITED STATES PATENT OFFICE 2,397,547

SALTED FISH

Herbert Hempel, deceased, late of Essex, Mass., by Herbert K. Hempel, administrator, Essex, Mass., assignor to Gorton-Pew Fisheries Company, Ltd., Gloucester, Mass., a corporation of Massachusetts No Drawing. Original application May 21, 1942, Serial No. 443,928. Divided and this application February 22, 1944, Serial No. 523,480

7 Claims. (Cl. 99—160)

This invention relates to a method of treating salt to overcome or prevent the growth of red bacillus and to the resulting products.

It is a well known objection to sea salt, or salt derived from sea water, that it is contaminated with Spirochaetes, which are pink and red bacilli which, upon development, are bright red and spread rapidly under suitable conditions. Such development and spreading does not ordinarily take place in the salt by itself nor in concentrations of salt less than 15%. But in salty environments presenting a concentration of 15% or more of salt, a protein material, upon which the bacillus feeds and multiplies, and especially at temperatures of 60–80° F. with exposure to the air, such development and spreading occur and rapidly reach extensive proportions, which seriously affect the entire industry involved, such as the fish industry which uses such salt on its products, as well as the salt recovery and refining industries themselves.

The present invention overcomes or prevents such development and growth of red bacillus, and makes possible a product which is substantially reduced in red bacilli content or freed therefrom. It also improves the apparatus and environment of such industries as make, store, use or sell sea salt. It may further render sea salt available and satisfactory in other industries where it is not now commercially practicable to employ it.

Other advantages will appear from the following disclosure.

It has been proposed to subject sea salt to high temperatures, thereby to kill the infection, in whatever form it may be present. But such treatment is found not only to darken the salt unduly, probably by the charring of carbonaceous matter, but also to impart an undesirable odor or flavor to the salt, which may be attributed to partial decomposition of the organic matter which it contains and which is retained in or between the salt crystals.

In accordance with the present invention it is found that salt which normally shows a tendency to develop red bacillus contamination, under suitable conditions as above described, may be protected and prevented from such development or from subsequent contamination with red bacillus by mixing it with a small amount of an acid phosphate, preferably of the alkali metals or of ammonium, or suitable acid phosphates of the alkaline earth metals may be used. Preferably the salt is in its usual relatively dry condition containing 1–3% of moisture. It may be of substantially any grade or size, and prepared by any of the usual commercial methods of recovering and refining salt, though if it has been purified to such an extent as to render the salt free from the red bacilli or to have destroyed the red bacilli content altogether, such treatment will not be necessary. Nevertheless, it may be advantageously applied in such cases in order to protect pure salt against subsequent contamination with red bacillus.

The acid phosphate may also be in relatively dry, solid form and is preferably finely pulverized before adding to the salt to be treated, for this renders it both more effective and more efficient.

In preparing sea salt, in accordance with the invention, and more specifically for rendering it more satisfactory in the salting of fish, for example, the dry seal salt is put into a suitable mixer, such as a mixing drum, and from ¼% to 4% (preferably ¼% to ¾%) by weight of acid phosphate is added, such as disodium phosphate or sodium diacid phosphate. Corresponding potassium and ammonium acid phosphates or double phosphates, such as sodium potassium acid phosphate, may be employed, but the sodium acid phosphates are preferred, either separately or in admixture.

The charge is then simply agitated in any convenient way, as by rotating the mixing drum, until uniform distribution of the acid phosphate over the surfaces of the crystals of sea salt and also, preferably, between the crystalline leaves in the aggregates of salt crystals which are sometimes built up, has been substantially completely effected. Of course if considerable areas or volumes of the sea salt are not reached by the pulverized acid phosphate they cannot be regarded as treated therewith and can not be expected to be freed from their contamination with the red bacillus. On the other hand complete coverage of all of the surfaces of the salt crystals with the acid phosphate does not appear to be essential in order for the treatment to be satisfactorily effective.

The treated sea salt, as thus obtained, is found to be wholly satisfactory for use, for example, in the salt fish industry. It does not spontaneously develop red bacillus, either in storage or in the apparatus used for making and handling it, such as evaporating pans, storage bins, bags and other containers. Likewise, it remains free from such development after it is brought to the fisheries, and is kept in storage and handled there. More especially, it manifests freedom from red bacillus development, spreading and contamination in the apparatus used for handling and salting the fish and upon the fish which are salted and laid down therewith, which may be done in the usual ways. Customarily this consists in spreading or laying down first a layer of fish and then a layer of salt, a layer of fish, and alternating until the butt or other container is filled.

It accordingly follows that the treated salt is protected not only from spontaneous development of red bacillus therein under conditions otherwise favorable to such development and spreading, but that even when applied to fish and thus furnished with the food necessary to such growth, such growth is inhibited or the bacilli are destroyed. The salt, or the product treated therewith, such as salted fish, is also protected against subsequent occurrence of such favorable conditions for growth, since the sea salt and finely divided acid phosphates, once mixed, remain commingled and mutually associated henceforth. The acid phosphates used are not deleterious nor detrimental in any respect to the salt or to the fish, which is of course intended for human consumption, since they are not only present in much smaller amount than the salt but are equally acceptable in the human dietary, especially in such reduced proportions.

The salted fish, as thus obtained with sea salt which has been treated with acid phosphates, as herein described, may undergo all of the conditions recited above as favorable to the development and spreading of red bacillus without showing any appreciable signs of such contamination, either on the fish, in the containers, in the equipment used in such treatment or in the other storage and handling apparatus of the fishery. It likewise overcomes or prevents the development and spread of contamination by red bacilli in the sea salt recovery and refining plants, as above mentioned, if carefully carried out and consistently applied.

In this connection, it is to be observed that the invention may be applied at any convenient stage in the process of recovering or refining the sea salt from the sea water or concentrated salt brines. Thus, the acid phosphate can be added to the sea water itself or to the concentrated brines in the course of their manufacture into salt. In such cases, the acid phosphate may itself be in solution. In this case, evaporation of such solution to separate the dry phosphate may be omitted. For example, the acid phosphate, as obtained, may be in a relatively crude condition and a leach liquor therefrom, containing the soluble acid phosphate component, may be employed directly for addition to the brine. Such a solution may also be used for addition to the crystalline salt, followed by further drying of the thus treated salt, if necessary. A uniform and effective distribution of the acid phosphate over the surfaces and between the salt crystals is effected in this way.

In adding the acid phosphate to the sea water or to the brines, some of it may be lost by reaction with the alkaline earth metals present in the sea water, to form relatively insoluble normal phosphates. It will, accordingly, be advisable to add the acid phosphate to brines from which the alkaline earth metals have been substantially completely removed, or removed to such extent as is intended.

It is to be understood that acid phosphates of the alkaline earth metals may be used in accordance with the invention, such as calcium acid phosphate, although they are of limited solubility. Likewise magnesium acid phosphate, though it imparts a bitter taste which may be objectionable in salt which is to be used in connection with food as for salting fish. Similar limitations obtain with respect to strontium acid phosphate and with barium acid phosphate, of which, of course, the barium component is definitely poisonous. However, with otherwise contaminated salts which are to be used for purposes in which these various properties are not detrimental, they may find convenient and valuable applications, and prevent or overcome the introduction of contamination with red bacillus. For example, sea salt to be used for refrigerating brines, for melting ice from side walks, and like purposes, may be so treated.

Moreover, it may be noted that the less soluble alkaline earth metal acid phosphates may be used with the more soluble alkali metal or ammonium acid phosphates described above, and thus they will effectively fortify each other with respect to their inhibiting or destructive action upon the red bacillus contamination. Accordingly, the application of the invention presents numerous economies of materials, labor, apparatus, time, and other factors, and produces a salt product which is freed from contamination with red bacillus and not subject to its subsequent infection and growth.

This application is a division of application Serial No. 443,928, filed May 21, 1942.

What is claimed is:

1. Salt fish characterized by being laid down with sea salt protected from red bacillus by a uniform distribution of finely divided particles of an acid phosphate directly upon and between the exposed surfaces of the salt crystals.

2. Salt fish characterized by being laid down with sea salt protected from red bacillus by a uniform distribution of finely divided particles of an alkali metal acid phosphate directly upon and between the exposed surfaces of the salt crystals.

3. Salt fish characterized by being laid down with sea salt protected from red bacillus by a uniform distribution of finely divided particles of ¼ to 4% of an acid phosphate directly upon and between the exposed surfaces of the salt crystals.

4. Salt fish characterized by being laid down with sea salt protected from red bacillus by a uniform distribution of finely divided particles of ¼ to ¾% of an acid phosphate directly upon and between the exposed surfaces of the salt crystals.

5. Salt fish characterized by being laid down with sea salt protected from red bacillus by a uniform distribution of finely divided particles of sodium diacid phosphate directly upon and between the exposed surfaces of the salt crystals.

6. Salt fish characterized by being laid down with sea salt protected from red bacillus by a unifrom distribution of finely divided particles of disodium acid phosphate, directly upon and between the exposed surfaces of the salt crystals.

7. Salt fish characterized by being laid down with sea salt protected from red bacillus by uniform distribution of a mixture of finely divided particles of acid phosphates, directly upon and between the exposed surfaces of the salt crystals.

HERBERT K. HEMPEL,
*Administrator of the Estate of Herbert Hempel, Deceased.*